United States Patent [19]

Levy

[11] Patent Number: 4,754,353

[45] Date of Patent: Jun. 28, 1988

[54] HARD DISK HEAD POSITIONER ASSEMBLY

[75] Inventor: Lloyd Levy, Chatsworth, Calif.

[73] Assignee: Micropolis Corporation, Chatsworth, Calif.

[21] Appl. No.: 944,466

[22] Filed: Dec. 19, 1986

[51] Int. Cl.$^4$ .................. G11B 21/08; G11B 5/56; G11B 17/02; B23P 11/02

[52] U.S. Cl. .................................... 360/106; 360/98; 29/447

[58] Field of Search ............... 360/106, 98; 29/447

[56] References Cited

U.S. PATENT DOCUMENTS

| | | | |
|---|---|---|---|
| 4,150,407 | 4/1979 | Dijkstra | 360/106 |
| 4,196,456 | 4/1980 | Manzke et al. | 360/106 |
| 4,286,298 | 8/1981 | Rinkleib | 360/106 |

Primary Examiner—Robert S. Tupper
Attorney, Agent, or Firm—Poms, Smith, Lande & Rose

[57] ABSTRACT

A digital storage system of the Winchester or hard disk drive type has a magnetic head positioner within which the arm-positioning body, including the heads, is rotatably mounted about a fixed stator assembly which includes a two-part shaft assembly comprising an aluminum cylindrical sleeve thermally shrink fitted about the central portion of an aluminum shaft having a pair of fixed ends and end portions reduced in diameter relative to the central portion by means of a pair of steel bearing assemblies attaching circumferentially about the sleeve in regions exclusive of the shrink fitted central portion of the shaft assembly. The clearance thus provided between the shaft and the mounting sleeve in the regions of the bearing assembly attachment permits a degree of decoupling of mechanical resonances potentially introduced into the head position servocontrol loop by mounting stresses acting upon the shaft.

12 Claims, 2 Drawing Sheets

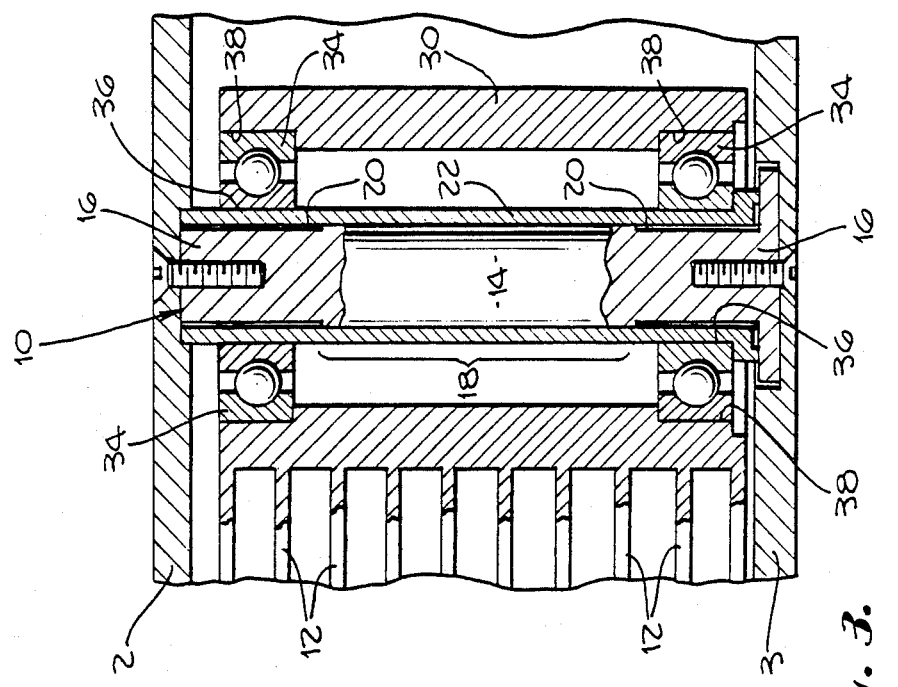
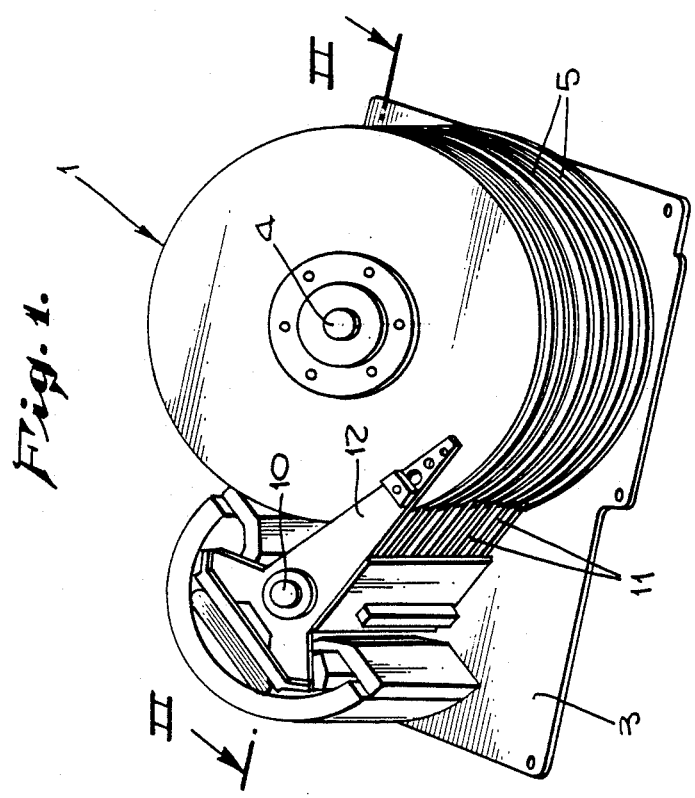
Fig. 3.
Fig. 1.

HARD DISK HEAD POSITIONER ASSEMBLY

BACKGROUND OF THE INVENTION

1. Field of the Invention

This invention pertains, in general, to digital information storage systems, and in particular, to high capacity hard disk drives.

2. Description of the Related Art

Digital data may be stored on flexible or "floppy" disks or on hard or Winchester type disks by the magnetization of successive small areas on the magnetic surface of the disk, by means of a magnetic head or "slider", as the disk rotates. The density of digital storage on a hard disk memory system is on the order of 10 to 20 times the density achieved with floppy disk memory systems. In hard disk systems, the disks are normally formed of aluminum, and have a magnetizable coating on their upper and lower surfaces.

In order effectively to read and write information on the hard disks' magnetizable surfaces, a head positioner is typically provided within the drive wherein a plurality of rigid, interleaving head-positioning arms, each having one or more magnetic heads mounted on it, are assembled in a tandem, spaced relationship within an arm-positioning body containing an electromagnetic coil. The arm-positioning body is, in turn, rotatably mounted coaxially about a fixed shaft assembly, by means of steel bearing assemblies which attach between an inner surface of the arm-positioning body and outer surface of the rigid, fixed shaft. A separate but closely mounted permanent magnet structure provides a magnetic flux that operates in conjunction with the electromagnetic coil to achieve torque generation. A direct current applied to the coil permits the position of the arm-positioning body to be controlled by means of a feedback control loop within which a surface of one of the hard disks is dedicated to head-tracking and position control.

The alignment of the tracking head with the control disk within the servo loop is accordingly critical in terms of accuracy of overall head-position control. A misalignment within the mechanical chain of only a few microinches can cause reading or writing malfunction. This source of malfunction is especially prevalent when the subassembly comprising the arm-positioning body, along with the shaft and preloaded bearings installed, is assembled within the hard disk assembly. The mounting forces associated with the attachment of the shaft to the hard disk assembly may adversely affect bearing preload and can cause shaft misalignment and/or mechanical resonances which prevent the positioning servo mechanism from functioning properly.

It is therefore an object of the present invention to provide a hard disk magnetic head positioner which is more immune to the introduction of tracking errors introduced by the installation of the positioner within the overall drive assembly.

SUMMARY OF THE INVENTION

These objects are preferably accomplished by the provision within a hard disk drive of a magnetic head positioner within which the arm-positioning body is rotatably mounted by bearing means about a two-part shaft assembly comprising a mounting sleeve thermally shrink fitted about a central portion of a rigid cylindrical shaft having fixed ends and a pair of end portions having a reduced diameter relative to the central portion, the bearings attaching to the shaft assembly in regions exclusive of the shrink fit central portion such that a clearance exists between the shaft and the sleeve in the region of the bearing mounting, thereby decoupling the bearings from distortions in the shaft occasioned by the attachment of the ends of the shaft within the drive.

These, and other objects and advantages of the present invention will become more evident to those skilled in the art from a consideration of the following detailed description of the preferred embodiment, particularly when read in conjunction with the appended drawings, a brief description of which now follows.

BRIEF DESCRIPTION OF THE DRAWINGS

FIG. 1 is a perspective view of a Winchester or hard disk drive with the upper cover removed;

FIG. 3 is a detailed cross-sectional view into the central hub of the arm positioner of FIG. 2.

DESCRIPTION OF THE PREFERRED EMBODIMENT

Figure 2:
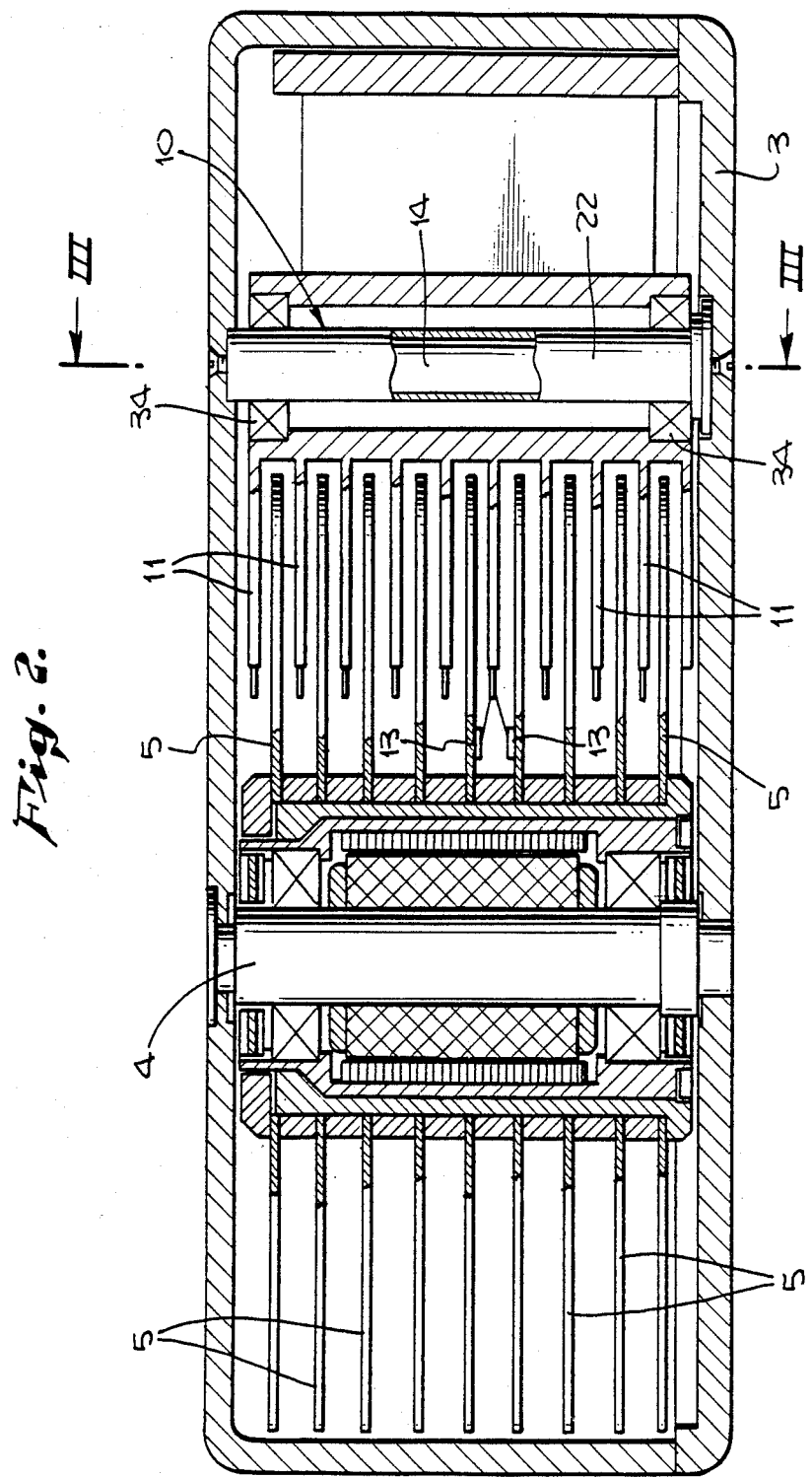
FIG. 2 is a cross-sectional view into a hard disk drive illustrating an arm positioner in keeping with the present invention.

Referring now to the drawings, FIG. 1 illustrates the disk drive unit 1 of a type in keeping with the subject of this invention. Disk drive 1 typically comprises a rigid, cast housing 2 (FIG. 3) and a plate 3, the illustration of FIG. 1 having the housing 2 removed from FIG. 1 to reveal the unit's contents.

The contents of the unit typically comprise a memory disk unit 4 operating in cooperation with a magnetic head positioning assembly 10.

Memory disk assembly 4 comprises a plurality of rigid storage disks 5 having a magnetizable surface and which are stacked coaxially in a tandem, spaced relationship and rotated about a common axis by means of a central electric motor, including a stator, relative to head positioner assembly 10 having a plurality of movable, interleaving head positioning arms 12, each having one or more magnetic heads 13 mounted thereon for reading and writing information magnetically on disks 5 as arms 12 are rotated interleaving into and out of disk storage unit 4 (see FIG. 2).

A feedback control loop or servo loop is included within arm positioner 10 in which a surface of one of hard disks 5 is dedicated to head-tracking and positional control. A common problem encountered in prior art drives is the mechanical resonances that occur within the servo loop which limit ultimate performance of the drive in terms of the time required to access information on disks 5, since the resonances have to be compensated for by a reduction of servo bandwidth.

One area that can cause resonance is associated with the stiffness of the bearings on which the head positioner assembly 10 pivots. Radial stiffness of these bearings is sensitive to the amount of axial load with which the assembly is preloaded. Various operational requirements impose a need to bond both inner and outer bearing races to the shaft and housing, respectively, to maintain preloads under shock, vibration and thermal loading. The amount of axial preload typically used is about 5 lbs., which is obtained with only 300 to 500 microinches of axial deflection.

Since the total deflection is so small, loads applied to the shaft during assembly or operation can cause the bearing to become partially unloaded. This condition will cause undesirable resonances to occur as a result of reduced radial stiffness.

It has been determined that a two-piece shaft can reduce the amount of deflection seen at the bearing races by providing an inner member which can deflect in response to external loads created by various mounting tolerance conditions, but which can transmit only part of these deflections to the outer sleeve which carries the bearings. Transmitted deflection is thus reduced by using only part of the inner shaft to hold the outer sleeve in place.

An arm positioner assembly 10 in keeping with the subject of the present invention is shown in cross-sectional detail in FIG. 3. Arm positioner 10 includes a central assembly which includes a cylindrical aluminum shaft 14 having a length generally coextensive with the stack of disks 5, a long axis generally parallel to the hard disk common axis, a pair of ends 16, at least one of which is fixed against rotation, a central portion 18 of a given diameter, and a pair of end portions 20 which are reduced in diameter relative to central portion 18.

An aluminum (or other metallic material such as stainless steel) mounting sleeve 22 having a length generally coextensive with shaft 14 is thermally shrink fitted coaxially about shaft 14 along central portion 18 such that a diametral clearance exists between an inner diameter of mounting sleeve 22 and shaft end portions 20. In the exemplary preferred embodiment illustrated, which is directed to Winchester-type hard disk drives, shaft 14 and sleeve 22 have a length of about 2.4" overall, central portion 18 of shaft 14 has a length of about 1.2", and end portions 20 have lengths of about 0.60" each. Central portion 18 has an outer diameter of about 0.3760" and sleeve 22 is dimensioned such that there is a nominal diametral interference of about 0.0006" at room temperature between the two parts. End portions 20 are reduced in diameter relative to central portion 18 to provide a nominal diametral clearance between end portions 20 and the inner diameter of mounting sleeve 22 of about 0.006" at room temperature. Thus, the interference between the shaft central portion 18 and the sleeve 22, and the clearance between the shaft end portions 20 and the sleeve 20, are a function of shaft length, shaft and sleeve diameter, shaft end portion fabrication, and shrink fitting of the sleeve 22 around the shaft 14. Sleeve 22 is normally assembled over shaft 14 by heating sleeve 22 and/or cooling shaft 14 to provide a minimum temperature difference between the two parts of about 300°–350° F. immediately prior to assembly, so that a clearance between the shaft 14 and sleeve 22 arises facilitating their assembly.

Arm positioner assmembly 10 further includes a hollow aluminum cylinder having an internal cylindrical surface and an outer cylindrical surface from which extend the substantially planar head-positioning arms 12. A "voice coil" is associated with the internal cylindrical surface of aluminum cylinder 30 and operates in conjunction with fixed permanent magnets (not illustrated) through the agent of a variable direct current applied to the coil to permit the rotational position of arm-positioning cylinder 30 to be controlled by means of the feedback control loops. In order to mount arm-positioning cylinder 30 for rotational movement about the stator, a pair of annular, steel ballbearing assemblies 34 are provided at opposite ends of mounting sleeve 22 and the inner diameter of arm-positioning cylinder 30. Bearing assemblies 34 are bonded in place at their inner diameters in a region 36 inclusive of end portions 20 of shaft 14 and exclusive of the central portion 18 of shaft 4 by means of a single-component, anaerobic adhesive known as Loctite®, which is also used to bond the outer cylindrical surface of bearings 34 to an inner cylindrical surface 38 of arm-positioning cylinder 30.

Skilled practitioners will recognize that the specific dimensions of the parts of the shaft assembly are calculated to trade off the reduction in transmitted deflection with reductions in the resonant frequencies associated with the deflection modes of the shaft assembly during assembly or operation. Accordingly, the dimensions, materials and methods of manufacture and assembly discussed and illustrated herein should be taken as exemplary in nature, and the scope and spirit of the instant invention is limited only by the claims appended hereto.

What is claimed is:

1. A magnetic head positioner for a hard disk storage system of the type wherein a plurality of rigid storage disks having a magnetizable surface are stacked coaxially in a tandem spaced relationship and rotated about a common axis relative to a plurality of movable, interleaving head-positioning arms, each said arm having one or more magnetic heads mounted thereon for reading and writing information magnetically on said disks, comprising:

a pivot bearing assembly, including:
   a cylindrical aluminum shaft having a length generally coextensive with said stacked disks, a long axis generally parallel to said disk common axis, a pair of ends, at least one of which is fixed against rotation, a central portion of a given diameter, and a pair of end portions which are reduced in diameter relative to said central portion;
   an aluminum mounting sleeve having a long axis, a length generally coextensive with said shaft, and wherein said sleeve and said shaft have a coaxial thermal shrink fit engagement therebetween along said central portion of said shaft and exclusive of said reduced diameter end portions;
coil means wound on a bobbin, said coil being attached to said head positioner, with magnets mounted in a separate structure to said sleeve; an arm assembly, including:
   an aluminum arm-mounting cylinder having a long axis, a length generally coextensive with said shaft assembly, an inner diameter, and wherein said plurality of head-positioning arms extend radially outward therefrom in a tandem, spaced relationship to interleave between said disks;
an electromagnetic coil disposed to interact electromagnetically with said permanent magnet means for rotating said arm assembly relative to said shaft assembly; and
bearing means located at both ends of said shaft assembly for coaxially mounting said arm-mounting cylinder rotatably thereabout in regions exclusive of said shrink fit central portion.

2. The positioner of claim 1, wherein:
said shaft and said sleeve have a diametral interference between each other along said central portion of about 0.0006" at room temperature.

3. The positioner of claim 1, wherein:
said shaft and said sleeve have a diametral clearance between each other at said end portions of about 0.006" at room temperature.

4. The positioner of claim 1, wherein:

said central portion has a length of about 1.2"; and
said end portions each have a length of about 0.60".

5. The positioner of claim 1, wherein:
said bearing means are adhesively-mounted between an outer radial surface of said mounting sleeve and an inner radial surface of said arm-mounting cylinder.

6. A head positioner for a hard disk drive, comprising in coaxial juxtaposition about a common axis:
a fixed cylindrical shaft having a middle portion and two end portions;
a cylindrical mounting sleeve having a length substantially coextensive with said shaft, said shaft and said sleeve having a shrink fit diametral interference therebetween along said shaft middle portion and a diametral clearance therebetween along said shaft's end portions at room temperature;
a pair of annular, steel ball bearing assemblies mounted about said sleeve at opposite ends thereof in regions exclusive of said interference fit, for rotatably mounting the rotor portion of said head positioner;
coil means wound on a bobbin attached to said rotor portion of said head positioner;
said rotor portion having a substantially outer cylindrical surface, and a plurality of rigid, substantially planar head-positioning arms extending radially outward therefrom, each said arm having a pair of oppositely-facing surfaces normal to said common axis; and
a plurality of magnetic heads, at least one of which is mounted on each of said arm's surfaces at a radially-outward position.

7. The positioner of claim 6, wherein:
said shaft and said sleeve are made of an aluminum alloy and have a diametral interference therebetween along said central portion of about 0.0006" at room temperature.

8. The positioner of claim 6, wherein:
said shaft and said sleeve are made of an aluminum alloy and have a diametral clearance therebetween along said end portions of about 0.006" at room temperature.

9. The positioner of claim 6, wherein:
said central portion has a length of about 1.2"; and
said end portions each have a length of about 0.60".

10. The positioner of claim 6, wherein:
said bearing means are adhesively-mounted between an outer radial surface of said mounting sleeve and an inner radial surface of said arm-mounting cylinder.

11. The positioner of claim 6, wherein said shaft and sleeve are made from a stainless steel metallic alloy.

12. The positioner of claim 6, wherein a nominal diametral clearance between the end portions of said shaft and the inner diameter of said sleeve is maintained while the central portion of said sleeve and said shaft maintain nominal interference, said interference and clearance being a function of the shrink fit and shaft end portion fabrication, said interference and clearance dimensioned as a function of shaft length and shaft and sleeve diameter.

* * * * *